March 9, 1954  J. H. BECKLEY  2,671,715
DEVICE FOR FACILITATING CHEMICAL TESTING
Filed Jan. 3, 1952
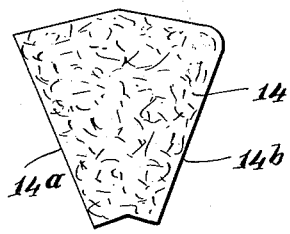
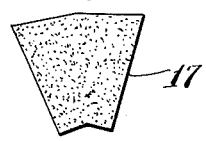
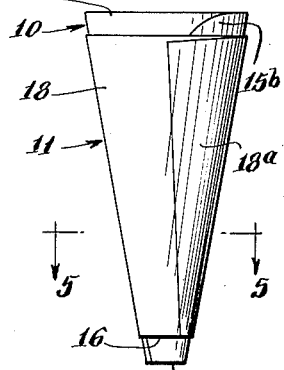
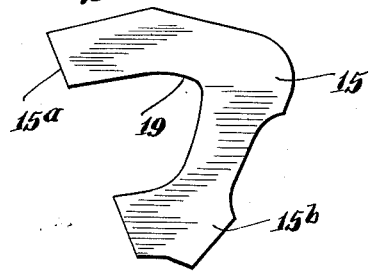
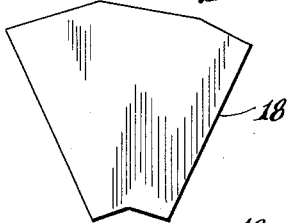
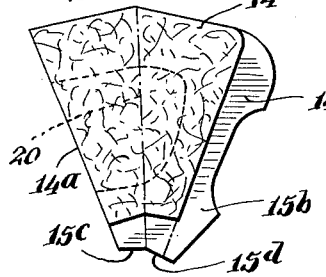
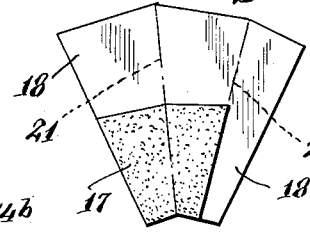
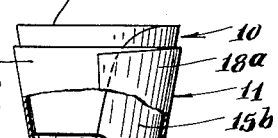
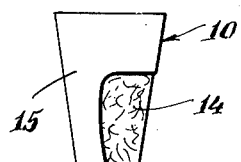
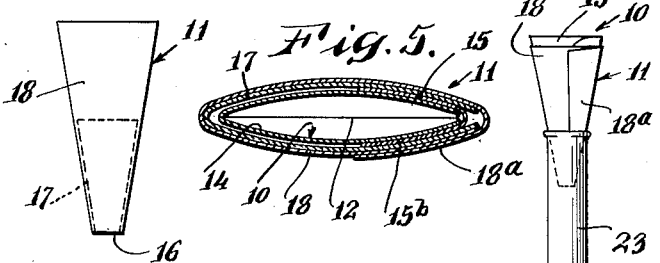
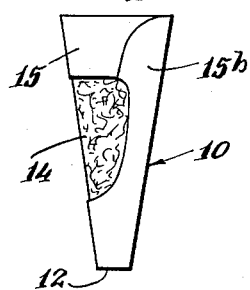
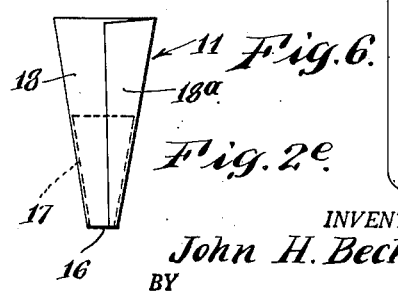
INVENTOR.
John H. Beckley
BY
Fraser, Myers Manley
ATTORNEYS.

Patented Mar. 9, 1954

2,671,715

UNITED STATES PATENT OFFICE 2,671,715

DEVICE FOR FACILITATING CHEMICAL TESTING

John H. Beckley, New York, N. Y., assignor to The Denver Chemical Manufacturing Company, New York, N. Y., a corporation of Colorado Application January 3, 1952, Serial No. 264,779

8 Claims. (Cl. 23—253)

This application is a continuation of the invention disclosed in my co-pending application, Serial No. 87,256, filed April 13, 1949, now Patent No. 2,633,410, issued March 31, 1953.

The invention relates to a device for facilitating chemical testing of liquids and aims to provide certain improvements therein. The device has general application in chemical analysis and, by way of example, is herein described in its application to the examination of urine or other body fluids for albumin.

The detection of small amounts of serum albumin and serum globulin in urine is of utmost importance, as their presence almost always indicates a pathological condition. There are several different methods employed for detecting said substances in urine. Some of these methods require the application of heat to the specimen being tested, others require the use of special reagents, while still others may be termed dry tests, wherein the only liquid employed is the specimen of urine being examined.

Most of the wet tests require at least three steps, namely: (1) the addition of an acid to the specimen to hold the phosphates in solution and to precipitate mucin and mucoids present; (2) filtering to remove debris such as pus cells; and (3) the addition of a reagent to coagulate or precipitate the albumin. Of course these tests require time for their performance and, where numerous tests must be made daily, for example, in a hospital laboratory, or where a test must be made rapidly, for example, in a physician's office where a patient under examination awaits the results of the test, or at the bedside of a patient, time is of the essence in making the test. The so-called dry tests heretofore proposed and which are designed to be performed in considerably less time than the wet test, have been found to be not wholly reliable.

According to conventional procedure, a urine to be tested for albumin must be acid to litmus paper. If it is not acid it must be so rendered by the addition thereto of acetic acid or some other acid. If the urine is neutral or alkaline, inaccurate findings may occur. The purpose of acidification is to put the amorphous phosphates which may be present in urine into solution, since the amorphous phosphates are precipitated in neutral or alkaline urine and thus form a white cloud or sediment which may give rise to the inaccurate finding. After the sample or specimen has been acidified, the urine should be examined to see if it is clear, and if not, it must be so rendered by filtration or centrifugation. Also, according to various authorities, one of the main sources of error in the detection of albumin in urine is the presence of mucin and mucoid bodies which are precipitated by acetic acid and hence may be removed by filtration after acidification of the specimen. After acidification and clarification the urine sample is ready for testing. The various methods heretofore employed involve the use of test tubes, pipettes, conical test glasses, funnels, filter paper, black spot test plates, various liquid reagents, and frequently a direct heat source of some kind.

The simplest and most reliable reagent for testing for albumin in a clear acidified urine sample is sulfosalicylic acid which, when added to a urine containing albumin or globulin, forms a turbidity or cloudiness in the specimen.

An object of the present invention is to provide a device by which chemical analysis of liquids can be carried out in one work cycle.

A further and more specific object of the invention is to provide a device for detecting albumin and globulin in urine and other body liquids which eliminates the difficulties and shortcomings in the known procedures in testing for said substances.

A further object is to provide a device for detecting albumin in urine and other body liquids according to which: (a) no liquid reagents are used; (b) false positives are eliminated; (c) the test is performed without the application of heat; and (d) the test can be completed in less than one minute.

The foregoing and other objects of my invention when applied to the one work cycle operation in the detection of serum albumin and serum globulin in urine I accomplish by the use of a specially prepared reagent-treated device which is adapted to be placed in a conventional funnel, the mouth of a test tube or the mouth of any other transparent receptacle into which the specimen to be tested is received after passing through the device, if clear, is free of albumin, and if cloudy or turbid, indicates the presence of serum albumin or serum globulin. The invention will be better understood from the detailed description which follows, when considered in connection with the accompanying drawings which show a preferred embodiment of my invention, and wherein:—

Figures 1a to 1d show side elevational views of the parts and steps followed in making one of the receptacles of the device of my invention.

Fig. 1e is a side elevational view taken at a right angle to Fig. 1d.

Figs. 2a to 2d show side elevational views of the parts and steps followed in making the second receptacle of the device of my invention.

Fig. 2e shows a side elevational view taken at a right angle to Fig. 2d.

Fig. 3 shows a side elevational view of the completed device embodying my invention.

Fig. 4 shows a view similar to Fig. 3 with parts broken away to better illustrate the relationship of the two receptacles constituting my device.

Fig. 5 shows a section taken along the plane of the line 5—5 of Fig. 3.

Fig. 6 shows a side elevational view of one manner in which the device of my invention may be used.

The device of the present invention consists of two liquid-receiving receptacles 10 and 11 disposed one within the other in nested relation, through which nested receptacles the liquid to be tested runs in a single sequence. Preferably the receptacles are of generally conical form. The receptacle 10 is formed with a closed bottom 12 and a bonded, laminated side wall, the development of which is shown in Fig. 1c, and is formed from the members 14 and 15, while the receptacle 11 has an open bottom 16 and a bonded, laminated side wall, the development of which is shown in Fig. 2c, and is formed from the members 17 and 18.

The inner receptacle 10 which is to provide a filter, is formed by laminating the member 14 which is preferably formed of fine grade filter paper with the member 15, which is preferably formed of a liquid-impermeable delay action heat seal paper which has a cut-out portion 19 which is covered by the filter paper 14, with at least one edge 14a of the filter paper in coincidence with an edge 15a of the heat seal paper, the two members being preferably bonded together by the application of heat thereto to form a unit, as shown in Fig. 1c. Said unit is then first folded along the hypothetical dot-dash line 20 with the filter paper innermost to bring the edge 14a into coincidence with the opposite edge 14b of the filter paper, and the flap 15b of the member 15 is then folded along the line of coincidence 14a, 14b to bring said flap 15b into overlying relation to the outer side of the first folded portion and, when in said position, heat is applied to seal the members into the form of a cone having the blunted, closed bottom 12, which closure results from the heat sealing of the portions 15c and 15d. When the member 10 is prepared for use in the detection of albumin in urine, the filter paper, prior to being bonded to the heat seal paper, is impregnated with a solution of an organic acid or anhydride and allowed to dry. Preferably the impregnating is performed with a 25% solution of citric acid.

The outer receptacle 11 is formed in a manner analogous to that described for the formation of the receptacle 10 and consists in applying the member 17, which is preferably formed of "velour" paper, over the lower portion of the member 18 which is formed of a liquid-impermeable delay heat seal paper with the flock surface of the velour paper exposed and the members 17 and 18 bonded together by the application of heat thereto. The composite member is then first folded along the hypothetical dot-dash fold line 21 with the velour paper innermost, and then again folded along the hypothetical dot-dash line 22 to bring the flap 18a into overlying relation to the first folded portion, and heat-sealed. In this connection, when sealing the flap 18a, care is exercised so that the surfaces of the folded, heat-sealed paper projecting above the velour paper will not become sealed. It will also be noted that by virtue of the shapes and disposition of the members 17 and 18, and particularly at the lower end of the said members, that when the folding and sealing is complete, the bottom will remain open, as shown at 16. When the member 11 is to be used for the detection of albumin in urine, the velour paper is impregnated with an albumin precipitating agent, and dried. Preferably, the albumin precipitating agent which I prefer to use is a 25% aqueous solution of mono-ammonium sulfosalicylate. Alternatively, the albumin precipitating agent may be sprayed onto the flock side of the velour paper, and dried, the flock providing an exceptionally fine adherent surface for the reagent.

The receptacles 10 and 11 when formed in accordance with the foregoing description or in any equivalent manner, are then nested together with the receptacle 10 within the receptacle 11. As shown in the drawing, the receptacle 10 is somewhat longer than the receptacle 11 and projects beyond both the top and bottom of the receptacle 11. When thus assembled the receptacle 10 will provide the acidifying and filtering medium for the urine to be tested, while the member 11 containing the albumin precipitating agent will receive the filtrate from the receptacle 10 and will react therewith if albumin is present in said filtrate to produce a turbidity or cloudiness in the run-off through the open bottom of the receptacle 11. Of course, in carrying out the tests, the nested receptacles may be placed in a test tube 23 or equivalent container adapted to catch the run-off and permit visual examination thereof. If desired, the nested receptacles may be bonded together through the application of heat to adjacent contacting portions of the heat-seal paper 15 and 18.

In the manufacture of devices of the character herein described it will be understood that the various members 14, 15, 17 and 18 may be die-cut from their respective materials and preferably after the materials 14 and 17 have been impregnated or coated with their respective reagents and dried; also, but a single heat-sealing operation need be employed following the folding operations of the respective laminated materials and, in fact, but a single heat-sealing operation need be resorted to if the respective laminated members, after folding, are nested together and then heat-sealed.

While I have shown and described a preferred embodiment of my invention designed for detecting the presence of albumin in urine, it will be apparent to those skilled in the art that by employing other reagents for treating the members 14 and 17, other chemical tests may be carried out, particularly in the qualitative analysis of liquids. Accordingly, it is to be understood that the specific character and construction of the specially prepared reagent-treated testing device, as well as the chemical reagents used therewith, may be varied within the range of mechanical and chemical skill without departing from the spirit of the invention and defined in the appended claims.

What I claim is:

1. A device for facilitating chemical testing comprising two dry nested receptacles adapted for insertion in the mouth of a funnel, test tube or the like, the inner receptacle having a closed bottom and a bonded laminated side wall, at least one of the laminations having an opening therethrough and another of said laminations being a filtering material covering the opening, the outer receptacle having an open bottom and a liquid impermeable side wall having adherent on its inner surface a dry chemical reagent over which a filtrate from the inner receptacle must flow before leaving the outer receptacle.

2. A device for facilitating chemical testing comprising two dry nested receptacles, the inner receptacle having a closed bottom and a bonded laminated side wall, at least one of the laminations having an opening therethrough and another of said laminations being a filtering material covering the opening having adherent thereon a dry chemical reagent, the outer receptacle having an open bottom and a liquid impermeable side wall having adherent on its inner surface a dry chemical reagent different from the reagent on the filtering material of the inner receptacle over which a filtrate from the inner receptacle must flow before leaving the outer receptacle.

3. A device for facilitating chemical testing comprising a receptacle having a bonded laminated side wall, a first lamination thereof being formed of heat seal paper having an opening therethrough and another lamination thereof being a filtering material heat-sealed to the first lamination and covering the opening in said first lamination, said filtering material having adherent thereon a dry chemical reagent.

4. A device for facilitating chemical testing comprising two dry nested receptacles, each of which has a laminated side wall consisting of a lamination of heat-seal paper and a lamination having adherent thereon a dry chemical reagent heat-sealed to the first lamination the heat-seal paper lamination of the inner receptacle having an opening therethrough, the second lamination of said receptacle being formed of filtering material and overlying the opening in the first lamination and the outer receptacle having its second mentioned lamination heat-sealed to the inner surface of the heat-seal paper lamination.

5. A device for detecting albumin in urine and other body liquids comprising two dry nested liquid receiving receptacles, the receptacle adapted to first receive the liquid having a closed bottom and a bonded laminated side wall, at least one of the laminations of which has an opening therethrough and another of said laminations is a filtering material overlying the opening, said filter material being impregnated with an acidifying reagent selected from the group consisting of organic acids, and their anhydrides, and the receptacle adapted to receive the filtrate from the first receptacle having an open bottom and a laminated side wall, the inner lamination having on the inner surface thereof an adherent coating of a dry albumin precipitating agent.

6. A device according to claim 5, wherein the albumin precipitating agent is mono-ammonium sulfosalicylate.

7. A device according to claim 5 wherein the laminations of the respective receptacles to which a reagent containing lamination is bonded, are formed of heat-seal paper.

8. A device according to claim 5 wherein the lamination having the albumin precipitating agent adherent thereon is formed of velour paper.

JOHN H. BECKLEY.

References Cited in the file of this patent

UNITED STATES PATENTS

| Number | Name | Date |
|---|---|---|
| 2,314,336 | Goodale | Mar. 23, 1943 |
| 2,314,548 | McClintock | Mar. 23, 1943 |